United States Patent [19]

Veite

[11] Patent Number: 4,624,277

[45] Date of Patent: Nov. 25, 1986

[54] PRESSURE REGULATING AND RELIEF VALVE

[76] Inventor: Harry Veite, 5678 Tree Moss La., North Ridgeville, Ohio 44039

[21] Appl. No.: 783,573

[22] Filed: Oct. 3, 1985

[51] Int. Cl.⁴ .............................................. G05D 16/06
[52] U.S. Cl. ............................... 137/116.3; 137/505.11
[58] Field of Search ................. 137/115, 116.3, 505.11, 137/116.5

[56] References Cited

U.S. PATENT DOCUMENTS

| | | | |
|---|---|---|---|
| 2,783,769 | 3/1957 | Philbrick | 137/116.5 |
| 3,457,837 | 7/1969 | Powell | 137/116.3 X |
| 4,171,004 | 10/1979 | Cerrato | 137/505.11 X |

Primary Examiner—Robert G. Nilson
Attorney, Agent, or Firm—Pearne, Gordon, Sessions, McCoy, Granger, & Tilberry

[57] ABSTRACT

A combination pressure regulating valve and pressure relief valve is disclosed in which the outlet pressure is regulated to a certain pressure level below the inlet level and excess pressures on either the inlet or outlet of the valve are relieved through a relief passage. The valve includes a diaphragm biased by an adjustable spring means and a compressible bellows which interact with each to perform both the regulating and relief functions.

11 Claims, 4 Drawing Figures

PRESSURE REGULATING AND RELIEF VALVE

BACKGROUND OF THE INVENTION

1. Field of the Invention

This invention relates to a valve for regulating the pressure of vapor or liquid which incorporates the ability or relieving pressure if it exceeds the regulated level by a predetermined amount.

2. Description of the Prior Art

In various fluid supply systems, it is often necessary to regulate the pressure level of a fluid and, at the same, to relieve pressure if the pressure of the fluid on the regulated side or the unregulated side of the valve exceeds a predetermined amount.

For example, in cryogenic supply systems for oxygen, nitrogen, and the like, gas is supplied to a pressure building regulator value from a pressure building coil connected to the bottom of the cryogenic liquid tank, which supplies the gas at a regulated pressure to the top of the tank. The gas in the tank, at the pressure level regulated by the pressure building regulator valve, forces the liquid out of the tank of the desired pressure through a liquid supply line. Because the tank pressure may increase above the regulated level due to evaporation of the cryogenic liquid in the tank, a second regulating valve must be used. This second regulating valve is sometimes known as an "economizer" regulator, since it permits the gas to flow from the tank to the gas supply line or to a vent line. In addition, it is possible that the level of the gas pressure in the pressure building coil may be too high to permit the gas to be supplied to the tank. In this case, a third valve must be used to relieve excess pressure in the pressure building coil.

Thus, it can be seen that three valves may be needed. A first valve to regulate pressure from the pressure building coil to the tank top. A second valve to relieve excess pressure in the tank top. And, a third valve to relieve excess pressure in the pressure building coil.

SUMMARY OF THE INVENTION

The present invention overcomes the disadvantages of prior art and provides other advantages heretofore not obtainable. The valve of the present invention provides in a single valve the functions of three valves of the prior. It regulates fluid pressure from the inlet side (which may be connected to a pressure building coil) to an outlet side (which may be connected to a tank top); it relieves pressure from the outlet side; and it relieves pressure from the inlet side. The valve of the present innvention thus provides a pressure regulating function whereby the outlet side of the valve provides fluid at a constantly regulated pressure which is below the pressure of the fluid supplied on the inlet side of the valve. In addition, the valve of the present invention provides pressure relief capabilities on both the inlet and outlet side of the valve whereby pressure is relieved from either side of the valve if it exceeds the limit by a predetermined amount. The relief pressure may be provided to a pressure relief line attached to a third port on the valve.

These functions are performed by the valve in the present invention in an efficient manner with the pressures being regulated and relieved accurately. In addition, the valve is adjustable so that the regulating level may be changed, and the relief level may be changed with respect to the regulating level. The valve which performs all of these functions may be produced economically because it has relatively few parts which can be easily assembled.

These and other advantages are achieved by the valve of the present invention for supplying fluid of a rate between 20 and 1,000 standard cubic feet per hour. The valve comprises a body having a first fluid passage, a second fluid passage communicating with the first fluid passage, a pressure relief passage communicating with the first and second fluid passages, and an ambient chamber vented to the ambient pressure. The valve also comprises a compressible bellows located in the first fluid passage. The bellows is capable of sealing the first fluid passage from the second fluid passage and is also capable of sealing the first fluid passage from the pressure relief passage. The valve also comprises a diaphragm separating the second fluid passage and the ambient chamber. The valve also comprises a connecting member located in the second fluid passage adjacent to the first vapor passage and attached to the diaphragm. The connecting member is capable of engaging the bellows to seal the second fluid passage from the pressure relief passage. The valve also comprises adjustable spring means biasing the diaphragm to urge the connecting member into sealing engagement with the bellows.

Preferably, the fluid inlet of the valve is connected to the first vapor passage and the fluid outlet is connected to second vapor passage. When the pressure in the outlet side of the valve decreases, the action of the spring means against the diaphragm thus forces the connecting member to compress the bellows opening the passage between the first fluid passage and the second fluid passage. When the pressure on the outlet side of the valve exceeds a predetermined limit, the pressure in the second fluid passage increases moving the diaphragm in opposition to the spring means and pulling the connecting member which is attached to the diaphragm away from the bellows to permit fluid from the second fluid passage to flow into the pressure relief passage. When pressure on the inlet side of the valve exceeds a predetermined limit, the pressure in the first fluid passage increases, compressing the bellows and permitting fluid from the first fluid passage to flow into the pressure relief passage.

DETAILED DESCRIPTION OF THE PREFERRED EMBODIMENT

Figure 1:
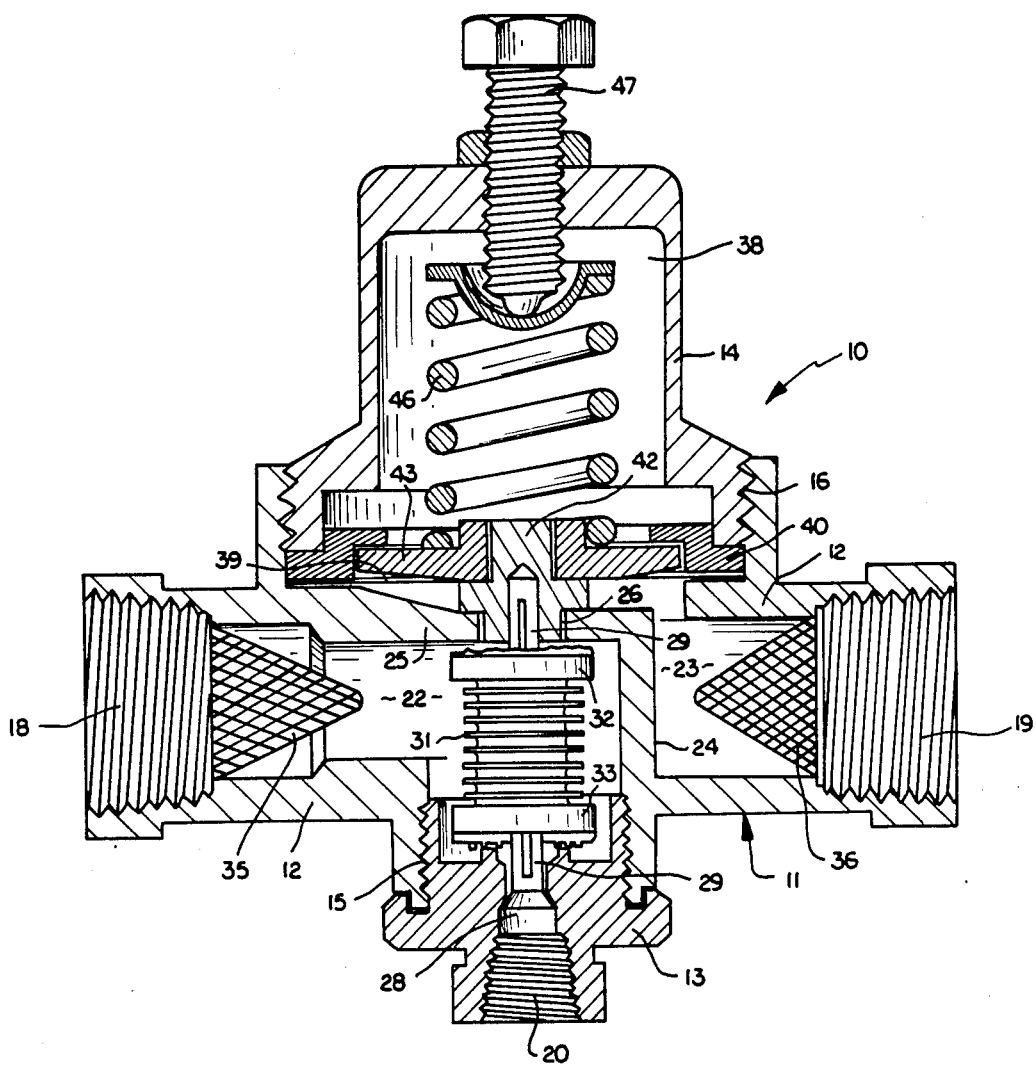
FIG. 1 is a side sectional view of the valve of the present invention showing the valve in an equilibrium condition in which the first fluid passage, the second fluid passage, and the pressure relief passage are all sealed with respect to each other.

Referring initially to FIG. 1 there is shown the valve 10 of the present invention. The valve 10 has a body 11 consisting of a main body member 12, a relief connecting body member 13, and a spring containing body member 14. The body member 13 is connected to the main body member 12 by a threaded connection 15, and the body member 14 is connected to the main body member 12 by a threaded connection 16.

The valve 10 has a fluid inlet 18 having an internal thread for connection to a conduit. The valve 10 also has a fluid outlet 19 having an internal thread for connection to a conduit. The valve 10 also has a pressure relief line connection 20 formed in the body member 13 and having an internal thread for connection to a relief line.

The fluid inlet 18 is connected to a first fluid passage 22 formed in the valve body 11. The fluid outlet 19 is connected to a second fluid passage 23 which is also formed in the valve body 11. The first fluid passage 22 is separated from the second fluid passage 23 by a wall 24 and a wall 25. The walls 24 and 25 are both formed as part of the valve body 11. An opening 26 is provided in the wall 25 so that the first fluid passage 22 may communicate with the second fluid passage 23.

The pressure relief line connection 20 is connected to a pressure relief passage 28. The pressure relief passage 28 is connected to a slotted tube 29 which extends through the first vapor passage 22, through the opening 26, and into the second fluid passage 23. The slot in the tube 29 permits fluid in either the first fluid passage 22 or the second fluid passage 23 to enter the tube 29 and flow into the pressure relief passage 28.

A compressible bellows 31 is mounted in the first fluid passage 22 around the slotted tube 29. The bellows 31 extends from the opening 26 to the connection between the pressure relief passage 28 and the first fluid passage 22. The bellows 31 includes sealing members 32 and 33 on each end of the bellows. The sealing member 32 is capable of sealingly engaging the wall 25 around the opening 26 to seal the first fluid passage 22 with respect to the second fluid passage 23 and prevent fluid from flowing between the passages 22 and 23. The sealing member 33 is capable of sealingly engaging the portion of the body member 13 adjacent to the relief passage 28 to prevent fluid from flowing from the first fluid passage 22 into the relief passage 28.

The bellows 31 normally has a design pressure differential of approximately 30 psi, so that a pressure differential of 30 psi is required between the pressure of the fluid in the first fluid passage 22 and the pressure of the fluid in the relief passage 28 before the bellows will compress to unseal the sealing member to permit pressure relief.

A pair of conical screens 35 and 36 are used to filter the fluid entering the valve to prevent contamination. The screen 35 is positioned at the fluid inlet 18, and the screen 36 is positioned at the fluid outlet 19.

The body member 14 is hollow forming an ambient chamber 38 which is vented to the exterior of the valve. The ambient chamber 38 is separated from the second fluid passage 23 by a diaphragm 39. The periphery of the diaphragm 39 is held in place between a retaining ring 40 and the side of the main body member 12. The retaining ring 40 is captured by the body member 14 which is attached to the main body member 12 at the threaded connection 16. The diaphragm 39 has a central opening in which is mounted a connecting member 42. The connecting member 42 has a larger diameter portion within the second fluid passage 23 which abuts the diaphragm 39. The connecting member 42 is held in contact with the diaphragm 39 by a cap 43. The cap 43 has a central opening which engages the portion of the connecting member 42 extending into the ambient chamber 38 so that the connecting member 42 is held in engagement with the center of the diaphragm 39. The end of the connecting member 42 extending into the second fluid passage 23 has a central bore into which the end of the slotted tube 29 extends. The end of the connecting member 42 which extends into the second fluid passage 23 is capable of extending into the opening 26 and engaging the sealing member 32 of the bellows 31. When the connecting member 42 engages the sealing member 32 of the bellows 31, it prevents fluid from flowing from the second fluid passage 23 into the slotted tube 29 and into the relief passage 28.

The connecting member 42 is formed with peripheral slots or flutes which permit fluid to flow around the connecting member and through the opening 26 when the sealing member 32 of the bellows 31 is out of engagement with either the connecting member 42 or the wall 25.

The diaphragm 39 is biased toward the second fluid passage 23 by a spring 46 engaging the cap 43 which is connected to the connecting member 42. The force of the spring 46 is adjustable by means of an adjusting screw 47 mounted in the end of the body member 14 of the valve body 11. The end of the adjusting screw 47 engages a retaining cup 48. The spring 46 extends between the retaining cup 48 and the cap 43.

The operation of the valve of the present invention can be seen by comparing FIGS. 1-4.

In FIG. 1, the valve 10 is in a equilibrium condition. The fluid pressure at the fluid outlet 19 is at the desired controlled level with respect to the ambient pressure. This controlled fluid pressure level is set by means of the adjusting screw 47. The adjustable force of the spring 46 balances the pressure differential between the pressure of the fluid in the second fluid passage 23 and the ambient pressure in the ambient chamber 38, so that the diaphragm 39 remains in the equilibrium position shown in FIG. 1 with the connecting member 42 engaging the sealing member 32 of the bellows 31, and the sealing member 32 of the bellows 31 engaging the wall 25. Thus, the second fluid chamber 23 is effectively sealed from the first fluid chamber 22 and from the slotted tube 29 connected to the relief passage 29. In addition, the pressure of the fluid at the inlet 18 does not exceed the fluid pressure at the outlet 19 or in the relief tube connection 20 by more than the design compression level of the bellows 31, so that the bellows 31 is not compressed. The bellows 31 is fully extended with the sealing member 32 engaging the wall 25 and the sealing member 33 engaging the body member 13 to seal the first fluid passage 22 from both the second fluid passage 23 and the relief passage 28.

Figure 2:
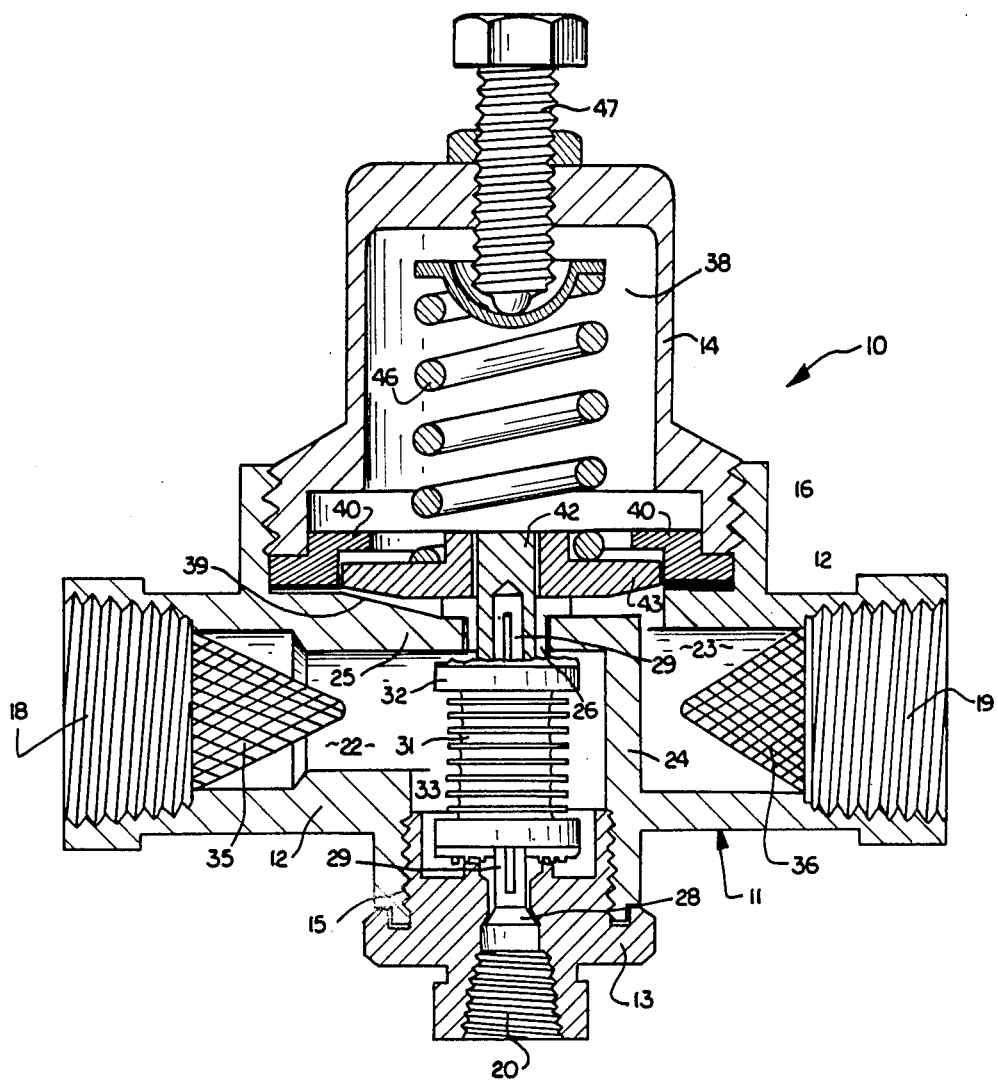
FIG. 2 is a side sectional view of the valve similar to FIG. 1 showing the action of the valve when the pressure in the second fluid passage decreases below a predetermined limit allowing fluid from the first fluid passage to flow into the second fluid passage.

When the pressure at the fluid outlet 19 decreases, the valve 10 reacts as shown in FIG. 2. When the pressure of the fluid at the outlet 19 drops below a predetermined level with respect to the ambient pressure, the spring 47 forces the diaphragm 39 downwardly as shown in FIG. 2. The connecting member 42 is pushed downwardly by the downward movement of the diaphragm 39. Since the connecting member 42 engages the sealing member 32 of the bellows 31, the bellows 31 is compressed, allowing the sealing member 32 to disengage from the wall 25. This permits fluid to flow from the first fluid passage 22 through the opening 26, through the peripheral slots or flutes in the connecting member 42, and into the second fluid passage 23. As fluid flows from the inlet 18 to the outlet 19, the pressure at the outlet 19 increases returning the diaphragm 39 upwardly as shown in FIG. 2 and returning the valve to the equilibrium condition as shown in FIG. 1.

Figure 3:
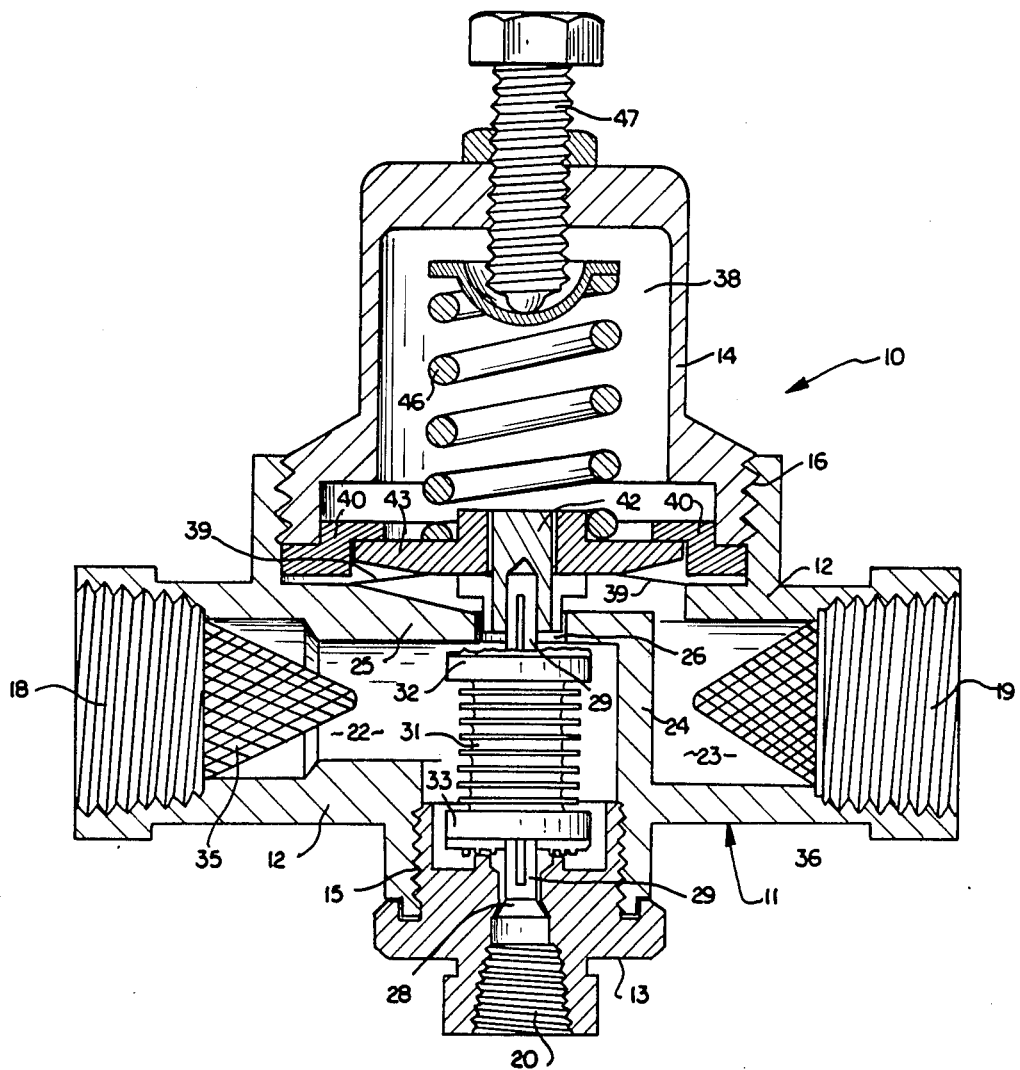
FIG. 3 is side sectional view of the valve of FIGS. 1 and 2 showing the action of the valve when the pressure in the second fluid passage increases above a predetermined limit, allowing fluid from the second fluid passage to flow into the pressure relief passage.

When the pressure at the fluid outlet 19 increases above the desired level, the valve reacts as shown in FIG. 3. The increased pressure in the second fluid passage 23 causes the diaphragm 39 to move upwardly as shown in FIG. 3. The connecting member 42 which is attached to the diaphragm 39 is pulled upwardly and disengages from the sealing member 32 of the bellows 31. This permits fluid to flow from the second fluid chamber 23 around the connecting member 42 and through the peripheral slots or flutes in the connecting member, and into the slotted tube 29 which is connected to the relief passage 28. The fluid is relieved from the fluid outlet 19 and the second fluid passage 23 through the relief passage 28 until the fluid pressure at the outlet 19 returns to the proper level, at which time the diaphragm 39 moves downwardly as shown in FIG. 3 and returns to the equilibrium level as shown in FIG. 1.

Figure 4:
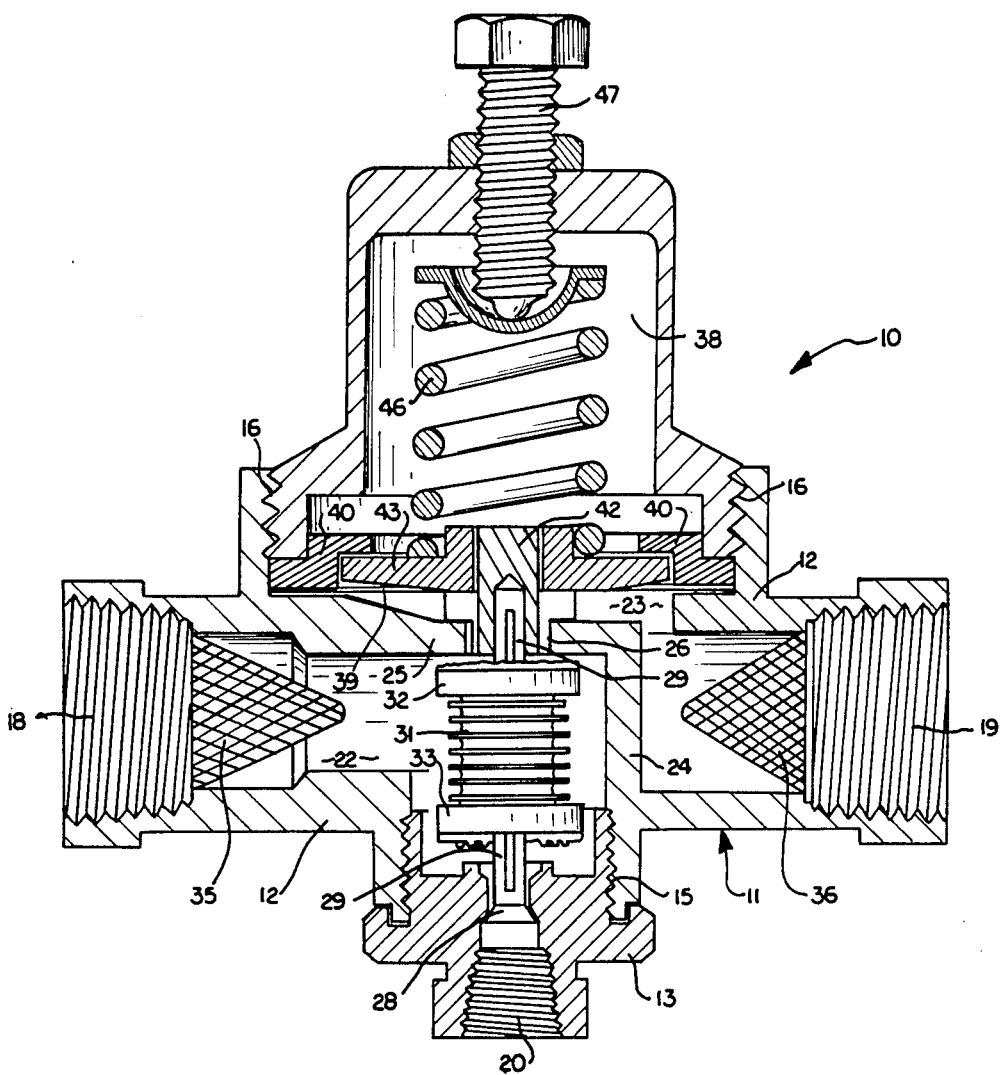
FIG. 4 is a side sectional view similar to FIGS. 1–3 showing the action of the valve in which pressure in the first vapor passage increases above the design limits of the bellows, allowing fluid from the first fluid passage to flow into the pressure relief passage.

When the fluid pressure at the inlet 18 exceeds a predetermined level, the valve 10 reacts as shown in FIG. 4. The increased pressure in the first fluid passage 22 causes the bellows 31 to compress allowing the second sealing member 33 to disengage from the body member 13. This will occur when the pressure in the first fluid passage 22 exceeds the pressure in the relief passage 28 by the pressure differential designed in the bellows 31. Typically, the bellows 31 will compress when the pressure differential is 15 psi. This permits fluid in the first fluid passage 22 to flow into the relief passage 28. Fluid continues to flow from the first fluid passage 22 into the relief passage 28 until the fluid pressure at the fluid inlet 18 returns to the proper level, at which time the bellows 31 expands and the valve returns to the equilibrium condition as shown in FIG. 1.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A valve for supplying fluid at a rate between 20 and 1,000 standard cubic feet per hour, comprising:
   a body having a first fluid passage, a second fluid passage communicating with the first fluid passage, a pressure relief passage communicating with the first and second fluid passages, and an ambient chamber vented to an ambient pressure;
   a compressible bellows located in the first fluid passage, the bellows capable of sealing the first fluid passage from the second fluid passage, the bellows also capable of sealing the first fluid passage from the pressure relief passage;
   a diaphragm separating the second fluid passage and the ambient chamber;
   a connecting member located in the second fluid passage adjacent to the first fluid passage and attached to the diaphragm, the connecting member capable of engaging the bellows to seal the second fluid passage from the pressure relief passage; and
   adjustable spring means biasing the diaphragm to urge the connecting member into sealing engagement with the bellows.

2. A valve as defined in claim 1, wherein decreased fluid pressure in the second fluid passage causes the diaphragm to move toward the second fluid passage, causing the connecting member which is attached to the diaphragm to push the bellows away from the second fluid passage to unseal the first fluid passage from the second fluid passage and allow fluid from the first fluid passage to flow into the second fluid passage.

3. A valve as defined in claim 1, wherein excess fluid pressure in the second fluid passage causes the diaphragm to move toward the ambient chamber, pulling the connecting member away from the bellows to unseal the second fluid passage from the pressure relief passage and allow fluid from the second fluid passage to flow into the pressure relief passage.

4. A valve as defined in claim 1, wherein excess fluid pressure in the first fluid passage causes the bellows to compress and unseal the first fluid passage from the pressure relief passage and allow fluid from the first fluid passage to flow into the pressure relief passage.

5. A valve as defined in claim 1, wherein the spring means is adjusted by means of a screw mounted in the body and extending into the ambient chamber and engaging one end of the spring means.

6. A valve as defined in claim 1, wherein the pressure relief passage includes a slotted tube extending through the compressible bellows.

7. A valve as defined in claim 1, wherein one end of the spring means engages a cap attached to the connecting member.

8. A valve for supplying fluid at a rate between 20 and 1,000 standard cubic feet per hour, comprising:
   a body having an inlet fluid passage, and outlet fluid passage communicating with the inlet fluid passage, a pressure relief passage communicating with the inlet and outlet fluid passages, and an ambient chamber vented to the exterior of the valve;
   a compressible bellows located in the inlet fluid passage, the bellows capable of sealing the inlet fluid passage from the outlet fluid passage, the bellows also capable of sealing the inlet fluid passage from the pressure relief passage; and
   a diaphragm separating the outlet fluid passage and the ambient chamber;
   a connecting member located in the outlet fluid passage adjacent to the inlet fluid passage and attached to the diaphragm, the connecting member capable of engaging the bellows to seal the outlet fluid passage from the pressure relief passage;
   an adjustable spring located in the ambient chamber and biasing the diaphragm toward the outlet fluid passage to urge the connecting member into sealing engagement with the bellows;
   decreased fluid pressure in the outlet fluid passage causing the diaphragm to move toward the outlet fluid passage and causing the connecting member to push the bellows away from the outlet fluid passage to unseal the inlet fluid passage from the outlet fluid passage and allow fluid from the inlet fluid passage to flow into the outlet fluid passage;

excess fluid pressure in the outlet fluid passage causing the diaphragm to move toward the ambient chamber, pulling the connecting member away from the bellows to unseal the oulet fluid passage from the pressure relief passage and allow fluid from the outlet fluid passage to flow into the pressure relief passage; and excess fluid pressure in the inlet fluid passage causing the bellows to compress and unseal the inlet fluid passage from the pressure relief passage and allow fluid to flow from the inlet fluid passage to flow into the pressure relief passage.

9. A valve as defined in claim 8, wherein the spring means is adjusted by means of a screw mounted in the body and extending into the ambient chamber and engaging one end of the spring means.

10. A valve as defined in claim 8, wherein the pressure relief passage includes a slotted tube extending through the compressible bellows.

11. A valve as defined in claim 8, wherein one end of the spring means engages a cap attached to the connecting member.

* * * * *